United States Patent [19]

Fuziwara

[11] Patent Number: 4,964,697
[45] Date of Patent: Oct. 23, 1990

[54] LENS BARREL HAVING CIRCUIT BOARD WITH POLYGONAL APERTURE

[75] Inventor: Yutaka Fuziwara, Kanagawa, Japan

[73] Assignee: Canon Kabushiki Kaishi, Tokyo, Japan

[21] Appl. No.: 274,959

[22] Filed: Nov. 22, 1988

[30] Foreign Application Priority Data

Nov. 27, 1987 [JP] Japan .................. 62-299016

[51] Int. Cl.$^5$ .................. G02B 5/00; G02B 27/00
[52] U.S. Cl. .................. 350/319; 350/429; 354/485
[58] Field of Search .................. 350/319, 429, 255; 354/295, 195.11, 400, 410, 485, 286

[56] References Cited

U.S. PATENT DOCUMENTS

| | | | |
|---|---|---|---|
| 4,134,654 | 1/1979 | Murakami et al. | 354/485 |
| 4,167,332 | 9/1979 | Sakurada et al. | 354/485 |
| 4,576,446 | 3/1986 | Kamata | 350/429 |
| 4,804,331 | 2/1989 | Eguchi et al. | 439/162 |

*Primary Examiner*—Bruce Y. Arnold
*Assistant Examiner*—Loha Ben
*Attorney, Agent, or Firm*—Fitzpatrick, Cella Harper & Scinto

[57] ABSTRACT

A lens barrel for use in an optical instrument such as a camera or other imaging device has a circuit board having an aperture which allows a light beam from a photographed object to pass therethrough. The aperture has a substantially polygonal shape which substantially coincides with an area of the light beam effective in forming an image on a recording portion including a film plane or an image sensing plane. The peripheral portion of the circuit board around the aperture provides a mounting area which is large enough to mount a large-sized IC chip which may include a zooming data processing circuit and other control circuits.

13 Claims, 6 Drawing Sheets

LENS BARREL HAVING CIRCUIT BOARD WITH POLYGONAL APERTURE

BACKGROUND OF THE INVENTION:

1. Field of the Invention:

This invention relates to a lens barrel attached to and used for an optical instrument such as a camera.

2. Description of the Related Art:

The current progress in electronic devices used in single-lens reflex cameras has brought about a remarkable improvement in function and utility of this type of cameras particularly when the cameras are used with lens units which are designed as original parts of the respective cameras. In general, electronic devices mounted in a camera, designed as an integrated circuit (referred to as IC), has a certain size. It is not easy to find a space for mounting such an IC in a restricted area of the camera, particularly in a lens barrel, and one solution to this problem is to increase the outside diameter of the lens barrel. Furthermore, telephoto lens barrels and zoom lens barrels of large magnification require that ICs incorporated in such lens barrels have highly complicated control circuits and various types of information in the form of electrical signals corresponding to the lens specifications, with the result that the sizes of the lens barrels are inevitably increased. On the other hand, lens barrels are required to meet, about all, a requirement for reduction in the size. Apparently, such a requirement is incompatible with the demand for installation of large ICs. Thus, it has been generally difficult to electronically represent a variety of lens specifications, and realization of high degree of electronic control has been almost impossible.

Figure 6:
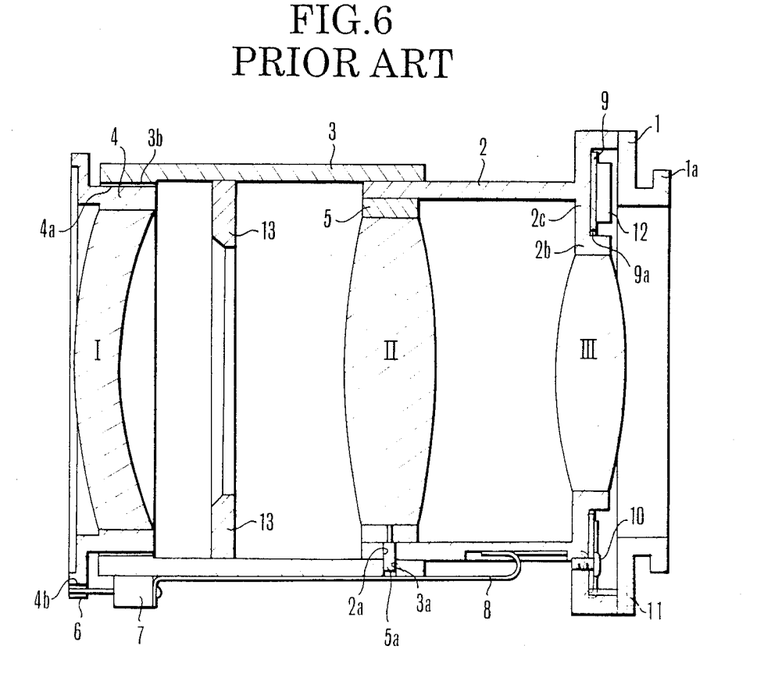
FIG. 6 is a schematic longitudinal sectional view of a known lens barrel.

FIG. 6 shows, by way of example, a zoom lens barrel (telephoto zoom lens) incorporating an IC.

The lens barrel comprises a body member supporting a lens group and has a mount 1 which is known per se and which is provided with a claw 1a for coupling to a camera body. The lens barrel further has a fixed tube 2 which is integral with the mount 1 and which is provided in the peripheral surface thereof with a cam groove 2a, and a movable tube 3 which fits on the outer peripheral surface of the fixed tube 2 for axial sliding movement thereon and which is provided in the peripheral surface thereof with a cam groove 3a. The inner peripheral surface of the front end portion of the movable tube 3 is provided with a screw thread 3b. The screw thread 3b engages with a screw thread 4a formed in the outer peripheral surface of a first lens holder tube 4 which is supported by the movable tube 3 to be axially movable and rotatable. Gear teeth 4b are formed on the outer peripheral surface of the front end portion of the first lens holder tube 4. A motor 7 is fixed to the outer peripheral surface of a front end portion of the movable tube 3. The motor 7 has an output shaft carrying a pinion 6 which is slidable in the axial direction and which is always held in engagement with the gear teeth 4b. Supply of electrical power and control signals to the motor 7 is conducted through a flexible printed circuit board 8 which extends along the outer peripheral surfaces of the movable tube 3 and the fixed tube 2 in the axial direction. The flexible printed circuit board 8 is connected at its rear end to a connecting terminal 11 which is provided on the rear end surface of the mount 1.

A second lens holder tube 5 fits in a front end portion of the fixed tube 2 for movement both in the axial direction and rotational direction. A pin 5a projecting from the outer peripheral surface of the second lens holder tube 5 is slidably received in the cam groove 2a of the fixed tube 2 and in the cam groove 3a of the movable tube 3. A first lens I held by the first lens holder tube 4 and a second lens II held by the second lens holder tube 5 are adapted to be moved axially in response to an axial movement of the movable tube 3 caused by manual effort of the photographer, whereby zooming control is effected. The movable tube 3 is provided with a diaphragm unit 13 which is known per se.

The fixed tube 2 serves also as a third lens holder tube. More specifically, a third lens III is fixed in a lens holding frame 2b which projects radially inwardly from the rear end of the fixed tube 2. An annular disc-shaped circuit board 9, which carries a circuit element (large-sized IC) 12 for controlling the motor 7, the diaphragm unit 13, etc., is fixed to an annular end plate portion 2c which is formed in an annular shape along the outer periphery of the lens holding frame 2b, by means of a screw 10. Circuits on the circuit board 9 also are electrically connected to the connecting terminal 11 on the mount 1.

The circuit board 9 provided on the zoom lens barrel known per se is located at the same position as the third lens III in the direction of the optical axis. This essentially requires that a central aperture 9a of the circuit board 9 has a considerably large diameter and, hence, the effective area of the annular circuit board 9 available for carrying the electronic elements is undesirably limited. Therefore, the circuit board 9 can carry only a small IC chip which can scarcely include a circuit for controlling the motor 7 and the circuit for controlling the diaphragm unit 13. Thus, the circuit board 9 cannot carry a large-sized IC chip which contains not only the circuits for controlling the motor 7 and the diaphragm unit 13 but also data processing circuits for processing data concerning a zooming operation and control circuits for actually executing the zooming operation. In consequence, the camera which makes use of interchangeable lens units of the type described could have only limited specifications, thus failing to meet the demand for an automatic photographing operation for realizing a high level of photographing technique.

The annular disc-shaped circuit board arranged in the vicinity of the mount of the lens barrel is shown in the drawings attached to the specification of U.S. Patent Application Ser. No. 134,976 filed on Dec. 18, 1987, now U.S. Pat. No. 4,804,331.

On the other hand, various detrimental light components such as light component reflected by the inner surface of the lens barrel and light component reflected by the glass surface inevitably exist in the lens barrel. These detrimental light components do not contribute to the formation of image but, rather, impedes the image formation seriously. It is known to provide a light-shielding plate (fixed diaphragm) in the vicinity of the mount of the lens barrel in order to obtain a good image forming performance by excluding the portion of the light beam which does not make contribution to the image formation in a rectangular image forming region on the film. The light-shielding plate has a substantially rectangular aperture which passes only the portion of the light beam which contributes to image formation while excluding the detrimental light components, so that any unfavorable effect on the image formation which may otherwise be caused by the detrimental light components is avoided.

SUMMARY OF THE INVENTION:

An object of the present invention is to provide a lens barrel which offers a large space for installation of an electronic component such as a large-sized IC.

To this end, according to one aspect of the present invention, there is provided a lens barrel comprising: a circuit board having an aperture which allows a light beam from a photographed object to pass therethrough, the aperture having a substantially polygonal shape which substantially coincides with an area of the light beam effective in forming an image on a recording portion including a film plane or an image sensing plane. The above and other objects, features and advantages of the present invention will become apparent from the following description of the preferred embodiments when the same is read in conjunction with the accompanying drawings.

DETAILED DESCRIPTION OF THE PREFERRED EMBODIMENTS:

An embodiment of the present invention will be described with reference to FIGS. 1 to 5. In these figures, the same reference numerals are used to denote the same parts or members as those appearing in FIG. 6.

Figure 1:
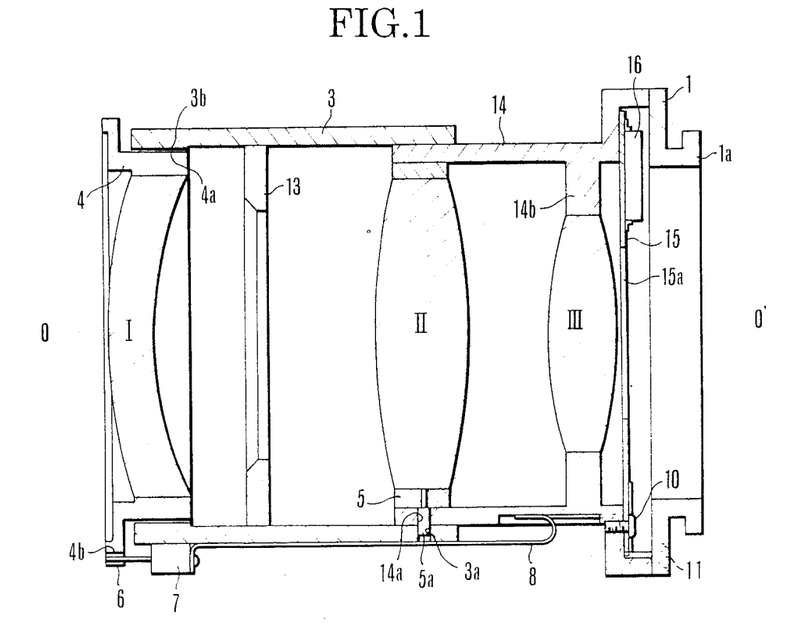
FIG. 1 is a schematic longitudinal sectional view of a lens barrel embodying the present invention.
Figure 2:
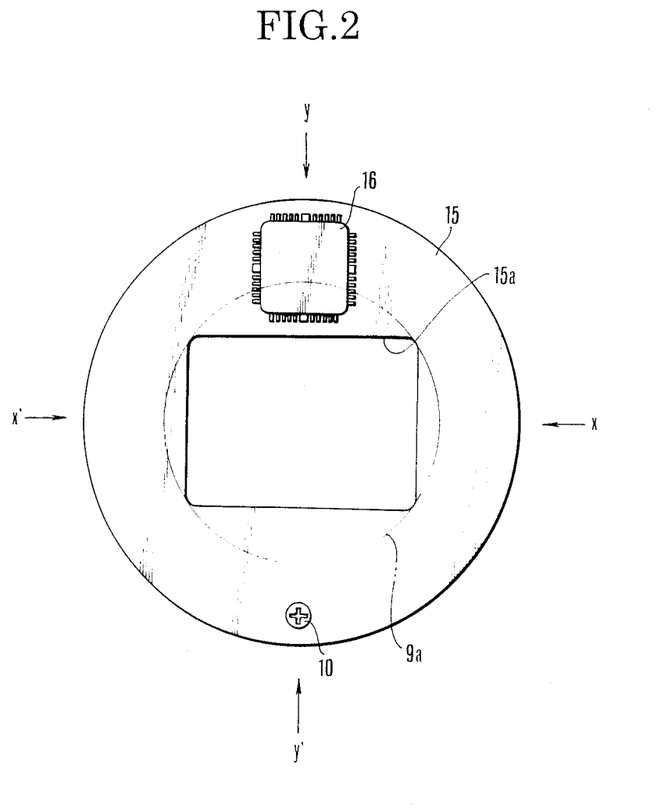
FIG. 2 is a front elevational view of a circuit board which is mounted in a lens barrel shown in FIG. 1.

Referring first to FIG. 1 which is a schematic longitudinal sectional view of a zoom lens barrel as an embodiment of the present invention, a circuit board 15 is disposed on the rear end of a fixed tube 14 adjacent to the camera body. The circuit board 15 carries a large-sized IC chip 16. A pin 5a on the second lens holder tube 5 is received in a cam groove 14a formed in the wall of the fixed tube 14. The fixed tube 14 has a lens holding frame 14b which holds the third lens III. In the zoom lens barrel of this embodiment, the lens holding frame 14b holding the third lens III is disposed on the front side of the position where the circuit board 15 is mounted. Namely, the third lens III and the circuit board 15 are offset from each other in the direction of the optical axis O—O'. In this specification, the term "front" and "rear" are used to denote the left and right sides as viewed in FIG. 1. It is therefore theoretically possible to maximize the area of the circuit board 15 other than the aperture formed in the circuit board 15. In this embodiment, the circuit board 15 has a central aperture 15a which has, as shown in FIG. 2, a substantially rectangular shape corresponding to the shape of a film plane or an effective imaging plane of an image sensing device such as a CCD. More specifically, the aperture 15a in the circuit board 15 of this embodiment has a substantially rectangular shape which inscribes the central aperture 9a formed in the circuit board 9 of the known arrangement described before in connection with FIG. 6.

The size of the aperture 15a is so determined that only the component of the light effective in forming an image can reach the film plane or the image sensing plane. In other words, the wide peripheral region of the circuit board 15 effectively prevents any light component which produces a detrimental effect on the image formation on the film plane or the image sensing plane, as well as light component which does not make contribution to the image formation, from reaching the film plane or the image sensing plane. In addition, since the aperture 15a has a rectangular shape, the width of the peripheral region, i.e., the distance between the edge of the aperture 15a and the outer peripheral edge of the circuit board 15 is greater than that in the known arrangement shown in FIG. 6, so that an IC chip 16 which is larger than the IC chip 12 of FIG. 6 can be mounted. This large-sized IC chip 16 can carry not only the circuits for controlling the lens driving motor and the diaphragm unit but also various other circuits such as a data processing circuit for processing data concerning the zooming control and a circuit for controlling the zooming operation. Therefore, a camera which can mount this zoom lens barrel as an interchangeable lens unit can have a variety of functions or specifications which could never be realized with known arrangement shown in FIG. 6.

In the arrangement shown in FIG. 2, the IC chip 16 is mounted in the portion of the peripheral region of the circuit board 15 spreading in the direction y—y'. It is to be understood, however, that an area of the substantially same size is available also in the direction x—x' so that the same IC chip 16 may be mounted on this area of the peripheral portion of the circuit board 15.

It is to be understood also that the circuit board 15 provides a large area for mounting not only the large-sized IC chip but also many small electronic elements. This large mounting area offered by the circuit board 15 also enables the degree of freedom in the design of the circuit pattern.

Figure 3:
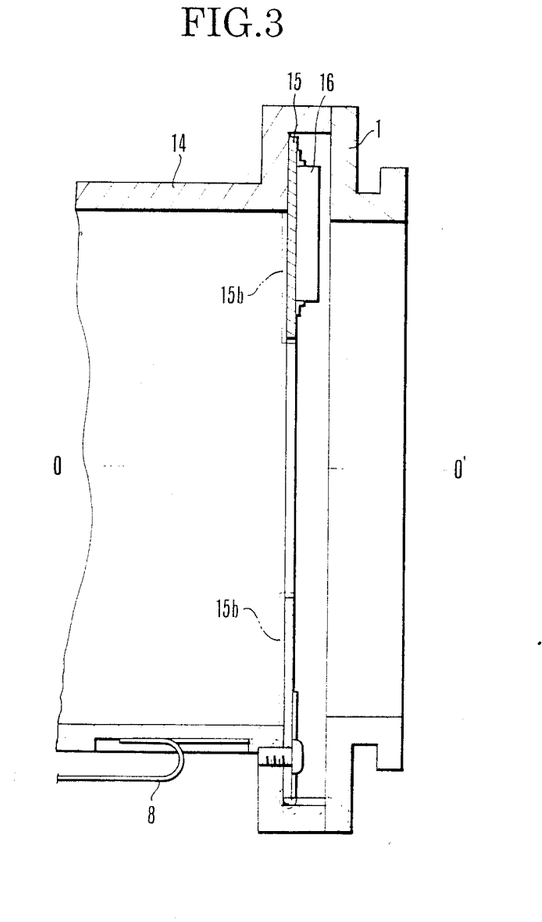
FIGS. 3 to 5 are illustrations of modifications of the circuit board incorporated in the lens barrel of the present invention.

FIG. 3 shows a modification of the embodiment shown in FIG. 2. This modification makes use of a circuit board 15 with a rectangular aperture having the same dimensions as those of the circuit board used in the arrangement of FIG. 2. In this case, however, the portion of the circuit board 15 which is around the rectangular aperture and which is subjected to the incident light is formed as an anti-reflection surface 15b as represented by two-dot-and-dash line in FIG. 3. Since the portion of the light beam impinging upon this anti-reflection surface 15b is not scattered, disturbance of the image-forming light beam impinging upon the film plane or the image sensing plane through the rectangular aperture is prevented, whereby a clear image is formed on the film plane or on the image sensing plane. The anti-reflection surface 15b may be realized by means of an anti-reflection coat or film or, alternatively, the surface of the circuit board facing object to be photographed, i.e., the surface opposite to the camera body, may be formed from an anti-reflection material.

Figure 4:
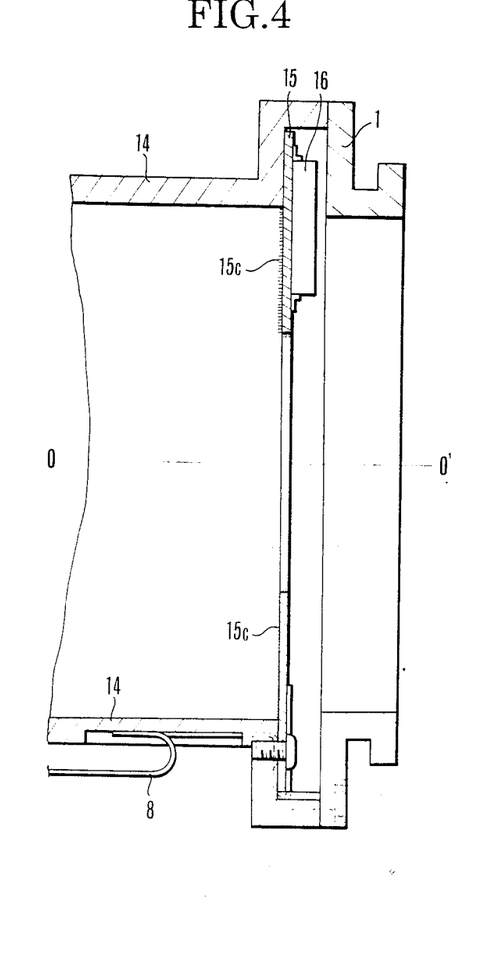

FIG. 4 shows a modification of the arrangement shown in FIG. 3. In this modification, the anti-reflection surface 15b formed on the light-incident side of the circuit board 15 is substituted by a pile layer 15c composed of fibrous elements planted on the circuit board 15.

Figure 5:
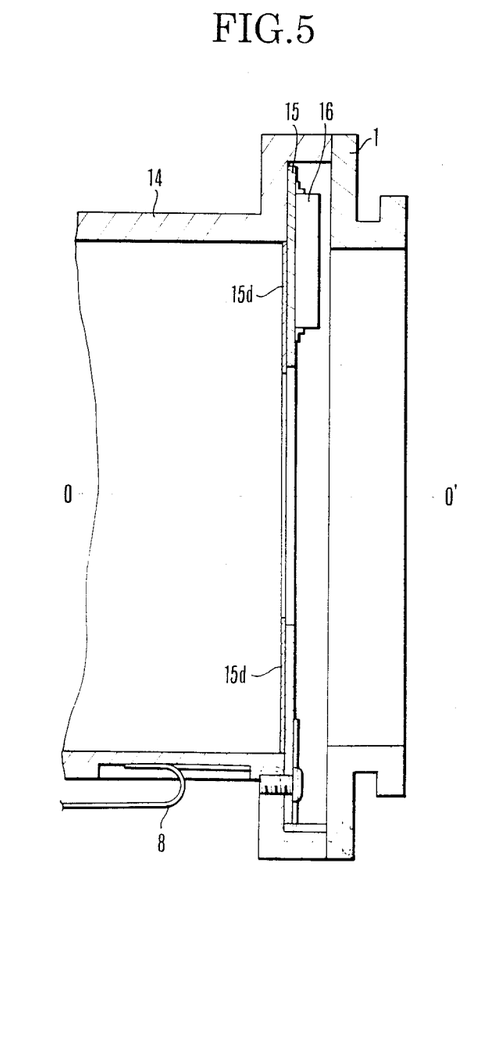

FIG. 5 shows a modification of the arrangement shown in FIG. 4. In this modification, an anti-reflection layer 15d is bonded in place of the pile layer 15c to the light-incident surface of the circuit board 15.

In the embodiment and modifications described hereinbefore, the circuit board 15 is disposed between the mount 1 and the third lens III which is the rearmost lens. This, however, is not exclusive and the substantially same effect is produced also when the circuit board 15 is disposed between the third lens III and the second lens II. Practically, the cross-sectional shape of the effective light beam varies along the optical axis of the lens system. From a theoretical point of view, the circuit board is disposed at such a position where the effective light beam has a substantially rectangular cross-section other than at positions where the effective light beam has substantially circular cross-sections.

In the described embodiment, the shape and size of the rectangular aperture 15a in the circuit board 15 are determined to provide the optimum condition, i.e., such as to materially maximize the area on the circuit board 15 available for the mounting of electronic components, when the circuit board 15 is fixed at the described position. Thus, the shape and size of the aperture in the circuit board 15 may be varied according to various factors such as the position of the circuit board 15 along the optical axis, optical characteristic of the lenses, and characteristic of the designer. For instance, the aperture formed in the circuit board can have a polygonal shape resembling an oval form or a form which is asymmetrical with respect to the horizontal or vertical neutral line.

As will be understood from the foregoing description, the lens barrel of the present invention employs a circuit board which has a substantially rectangular aperture shaped and sized to interrupt any detrimental light beam component and which is disposed in the vicinity of the mount of the lens barrel so as to function as a fixed diaphragm. The portion of the circuit board around the aperture is ample enough to provide a larger installation area capable of mounting large circuit components than those used in known lens barrels. In consequence, the camera used in combination with this lens barrel can have a higher degree of functions and specifications than those obtained with known cameras. In addition, the circuit board having a rectangular aperture, which is shaped and sized to pass only the light beam components effective for the image formation while interrupting any detrimental light component, ensures that a clear image is formed on the film plane or on the image sensing plane.

Thus, the circuit board used in the lens barrel of the present invention serves as a diaphragm which interrupts any detrimental light beam component, while providing a mounting area which is large enough to mount large-sized IC chips and other electronical components.

What is claimed is:
1. A lens barrel comprising:
a lens group with an optical axis,
a body member supporting said lens group, and
a circuit board having an aperture which allows a light beam from a photographed object to pass therethrough, said aperture having a substantially polygonal shape which substantially coincides with an area of said light beam effective in forming an image on a recording portion including a film plane or an image sensing plane, said aperture of said circuit board being arranged within said body member and on the optical axis of said lens group.

2. A lens barrel according to claim 1, wherein said circuit board is disposed near a rear end of said body member as viewed in the direction of the optical axis.

3. A lens barrel according to claim 2, wherein said aperture has a substantially rectangular shape.

4. A lens barrel according to claim 1, wherein said aperture has a substantially rectangular shape.

5. A lens barrel according to claim 4, wherein said circuit board carries a large-sized IC chip at its portion extending along a longer side of said substantially rectangular aperture.

6. A lens barrel according to claim 5, wherein said large-sized IC chip has a data processing circuit for processing data concerning a zooming operation of said lens barrel.

7. A lens barrel according to claim 1, wherein said circuit board is disposed in the vicinity of a mount portion where said body member is coupled to an optical instrument.

8. A lens barrel according to claim 7, wherein said circuit board is electrically connected to a connecting terminal provided on said mount portion of said body member.

9. A lens barrel according to claim 8, wherein said circuit board is connected through another printed circuit board to an actuator mounted in said body member.

10. A lens barrel according to claim 1, wherein said circuit board is disposed in the vicinity of said lens group which is disposed on a rear end of said body member as viewed in the direction of said optical axis.

11. A lens barrel according to claim 1, wherein an anti-reflection means is provided on a front surface of said circuit board as viewed in the direction of the optical axis.

12. A lens barrel according to claim 11, wherein said anti-reflection means includes a layer of an anti-reflection material.

13. A lens barrel according to claim 11, wherein said anti-reflection means includes a pile layer.

* * * * *

UNITED STATES PATENT AND TRADEMARK OFFICE
CERTIFICATE OF CORRECTION

PATENT NO. : 4,964,697

DATED : October 23, 1990

INVENTOR(S) : Yutaka FUZIWARA

It is certified that error appears in the above-identified patent and that said Letters Patent is hereby corrected as shown below:

On the title page:
[56] Attorney, Agent, or Firm--:

Change "Fitzpatrick, Cella Harper & Scinto" to --Fitzpatrick, Cella, Harper & Scinto--.

COLUMN 1:

Line 13, "cameras" (1st occurrence) should read --camera--;

Line 17, "has" should read --have--;

Line 60, "is" should read --are--.

COLUMN 2:

Line 56, "impedes" should read --impede--.

Signed and Sealed this

Sixteenth Day of June, 1992

Attest:

DOUGLAS B. COMER

Attesting Officer

Acting Commissioner of Patents and Trademarks